United States Patent
Haessler et al.

(10) Patent No.: US 9,635,532 B2
(45) Date of Patent: Apr. 25, 2017

(54) METHOD FOR SWITCHING A TERMINAL OVER FROM A FIRST RADIOCOMMUNICATIONS NETWORK TO A SECOND RADIOCOMMUNICATIONS NETWORK, CORRESPONDING COMPUTER PROGRAM PRODUCT, STORAGE MEANS AND TERMINAL

(71) Applicant: Sierra Wireless, Issy-les-Moulineaux (FR)

(72) Inventors: Ludovic Haessler, Vincennes (FR); Christophe Flechelle, Colombes (FR)

(73) Assignee: SIERRA WIRELESS, Issy-les-Moulineaux (FR)

( * ) Notice: Subject to any disclaimer, the term of this patent is extended or adjusted under 35 U.S.C. 154(b) by 0 days.

(21) Appl. No.: 14/504,073

(22) Filed: Oct. 1, 2014

(65) Prior Publication Data
US 2015/0094011 A1    Apr. 2, 2015

(30) Foreign Application Priority Data

Oct. 1, 2013    (FR) ..................... 13 59500
Jun. 16, 2014    (FR) ..................... 14 55490

(51) Int. Cl.
*H04W 4/22*    (2009.01)
*H04W 36/14*    (2009.01)
(Continued)

(52) U.S. Cl.
CPC ......... *H04W 4/22* (2013.01); *H04W 36/0072* (2013.01); *H04W 56/00* (2013.01);
(Continued)

(58) Field of Classification Search
CPC ..... H04W 76/007; H04W 4/22; H04W 92/02; H04W 76/02; H04W 88/12; H04M 2242/04; H04B 1/3816
See application file for complete search history.

(56) References Cited

U.S. PATENT DOCUMENTS 7,613,480 B2 *  11/2009  Brown ................. H04W 8/245
                                                          455/556.1
8,054,802 B2 *  11/2011  Burgess ...................... 370/331
(Continued)

FOREIGN PATENT DOCUMENTS

EP    2218281 A1    8/2010
WO   03103324 A1   12/2003
(Continued)

OTHER PUBLICATIONS

French Search Report and Written Opinion dated May 13, 2015 for corresponding French Application No. 1455490, filed Jun. 16, 2014.

*Primary Examiner* — Kashif Siddiqui
(74) *Attorney, Agent, or Firm* — David D. Brush; Westman Champlin & Koehler, P.A.

(57) ABSTRACT

A method is proposed for switching a radiocommunications terminal from a first radiocommunications network, with which the terminal is synchronized and registered, to a second radiocommunications network. The terminal has first and second connection profiles associated respectively with the first and second radiocommunications networks. According to the method, the terminal performs the following steps: for the second connection profile, a preliminary and at least partial synchronization of the terminal with the second radiocommunications network; and upon a switching request: a complete synchronization, based on said preliminary and at least partial synchronization, of the terminal with the second radiocommunications network; and registration (Continued)

of the terminal with the second radiocommunications network.

11 Claims, 4 Drawing Sheets

(51) Int. Cl.
*H04W 60/00* (2009.01)
*H04W 56/00* (2009.01)
*H04W 36/00* (2009.01)
*H04W 4/04* (2009.01)
*H04W 88/06* (2009.01)

(52) U.S. Cl.
CPC ............ *H04W 4/046* (2013.01); *H04W 36/14* (2013.01); *H04W 60/00* (2013.01); *H04W 88/06* (2013.01)

(56) References Cited

U.S. PATENT DOCUMENTS

| | | | |
|---|---|---|---|
| 8,874,171 B2* | 10/2014 | Matada | H04W 72/048 370/342 |
| 8,918,143 B2* | 12/2014 | Jacobs | H04W 8/183 455/411 |
| 2005/0277415 A1* | 12/2005 | Hamalainen | H04W 36/0094 455/436 |
| 2009/0111468 A1 | 4/2009 | Burgess et al. | |
| 2010/0041438 A1* | 2/2010 | Brown | H04W 8/245 455/558 |
| 2011/0217969 A1* | 9/2011 | Spartz | H04W 36/14 455/422.1 |
| 2011/0292786 A1* | 12/2011 | Haessler | H04B 17/327 370/216 |
| 2013/0023235 A1* | 1/2013 | Fan | H04W 48/18 455/411 |
| 2013/0165073 A1* | 6/2013 | Madsen | H04W 12/06 455/411 |
| 2013/0283047 A1* | 10/2013 | Merrien | H04W 12/08 713/164 |

FOREIGN PATENT DOCUMENTS

| | | | | |
|---|---|---|---|---|
| WO | 2009058220 A1 | 5/2009 | | |
| WO | WO 2013027085 A1 * | 2/2013 | ............ | H04W 8/183 |

\* cited by examiner

METHOD FOR SWITCHING A TERMINAL OVER FROM A FIRST RADIOCOMMUNICATIONS NETWORK TO A SECOND RADIOCOMMUNICATIONS NETWORK, CORRESPONDING COMPUTER PROGRAM PRODUCT, STORAGE MEANS AND TERMINAL

1. FIELD OF THE DISCLOSURE

The field of the disclosure is that of radiocommunications systems.

More specifically, the disclosure relates to a technique for switching a radiocommunications terminal from a first radiocommunications network to a second radiocommunications network. The first network is the one to which the terminal is connected, i.e. the one with which the terminal is synchronized and registered, and the second network is the one to which the terminal must switch.

The disclosure can be applied especially but not exclusively to cell radiocommunications networks, for example mobile telephony networks of the 3GPP, 3GGP2, GSM, GPRS, EGPRS, UMTS, IS-95, CDMA2000, LTE, LTE-advanced, and other types.

The disclosure finds particular application in the context of emergency calls using a mobile telephony network.

2. TECHNOLOGICAL BACKGROUND

We shall strive more particularly in this document to describe the problems and issues existing in the context of radiocommunications terminals that have to switch from one first network enabling access to telematic applications towards a second network enabling access to an emergency call service. The present disclosure is naturally not limited to this particular context of application but is of interest for any switching technique that must cope with similar or proximate problems and issues.

Such radiocommunications terminals traditionally have a first connection profile associated with a first radiocommunications network and a second connection profile associated with a second radiocommunications network. Each connection profile comprises all the data enabling the terminal to get connected, i.e. to get synchronized and register, with the network with which it is associated, this data being an identifier for connection to the network, international mobile subscriber identity (IMSI) number, the synchronization frequency band associated with the network, an authentication key, associated algorithms for authenticating the subscriber on the network, etc.

Typically, both connection profiles can be stored on one detachable card inserted in the radiocommunications terminal, for example a SIM card (Subscriber Identity Module), an ICC (Integrated Circuit Card), an IUCC (Universal Integrated Circuit Card) or an R-UIM (Removable User Identity Module) card, or else the two cards can be stored on two distinct detachable cards each being dedicated to the storage of one of the two connection profiles. Thus, when the terminal must switch to a radiocommunications network, this network gets physically connected either to the detachable card containing all the connection profiles or to the detachable card storing the connection profile relating to the network to which the terminal must switch, in order to extract therefrom the data needed for its synchronization and its registration.

The connection profiles can also be stored in a local memory integrated into the terminal or in a memory included in a remote equipment of the terminal such as for example a server having a storage memory and communicating with the terminal by means of a WiFi or Wimax radiocommunications system.

Here below the drawbacks of the prior art are discussed with reference to the particular case of a motorist whose vehicle has broken down or who has been in an accident, and wishes to make an emergency call.

In such a situation, the motorist can wish to use his mobile terminal, which is then connected to a present radiocommunications network (for example a telematic network compliant with the GSM standard) and may wish to switch it to a second radiocommunications network proposing access to an emergency call service.

The term "current network" refers to the radiocommunications network with which the terminal is connected, i.e. synchronized and registered (by the first network) and the term "substitution network" refers to the radiocommunications network to which the terminal must switch (the term used then is "second network").

Figure 1:
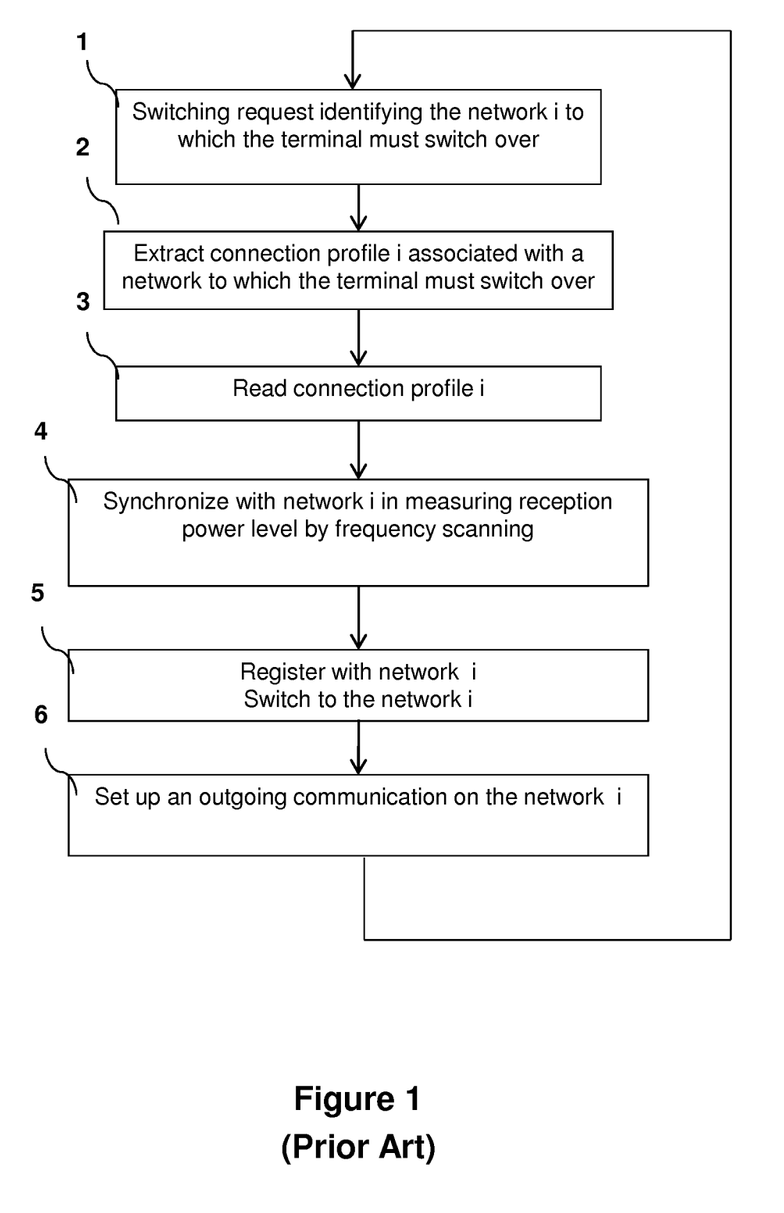
FIG. 1, already described with reference to the prior art, is a flowchart illustrating the classic working of a radiocommunications terminal switching technique.

As illustrated in FIG. 1, the working of the current technique for switching can be summarized as follows:
  step 1: the terminal receives a switching request which identifies the substitution network I towards which it must switch (this is the network providing access to an emergency call service here);
  step 2: upon reception of the switching request, the terminal gets physically connected to the SIM card to extract therefrom the connection profile relating to the substitution network i;
  step 3: the terminal reads the connection profile i as well as the associated information which will be used to implement the steps of synchronization and registration;
  step 4: the terminal measures the reception power level of the beacon frequencies that it receives in scanning the entire frequency band determined from the extracted connection profile i, in order to get synchronized with the substitution network i;
  step 5: once synchronized, the terminal gets registered with the substitution network i so that the terminal can switch to this network which then becomes the current radio telecommunications network;
  step 6: once the terminal is connected to this network, the user of the mobile terminal make an emergency call on the network providing access to an emergency call service.

When the terminal receives a new switching request, the steps 1 to 6 described here above are reiterated so that the terminal can switch from the current network to another substitution radiocommunications network.

The current switching technique however has several drawbacks. Indeed, the current switching process for switching from a first to a second radiocommunications network is relatively lengthy (typically more than 20 seconds for a GSM or UMTS network) since, whenever a switching is needed, it requires the implementation of a set of steps (extraction, reading, synchronization and registration) causing a loss of time before the connection to the network is made.

However, it is important in the context of a mobile communications, and especially emergency calls, that the switching from a terminal of a first communications network to a second radiocommunications network is done as speedily as possible in order to offer the user communications on the desired network within the best possible time limits.

Another known solution relies on the use of a DSDS (Dual SIM Dual Standby) type radiocommunications terminal. This type of terminal has two SIM cards, a first SIM card comprising a first connection profile associated with a first network, and a second SIM card comprising a second connection profile associated with a second network which can be activated simultaneously. This enables the simultaneous extraction of both connection profiles and the synchronization of the terminals simultaneously with both radiocommunications networks. When a call is made on one of the two networks via a SIM card, the other SIM card is made inactive, stopping the process of connection to the other network.

However, the "Dual SIM Dual Standby" method is based on a dual SIM card driver mechanism which is complex to implement since it requires, on the one hand, simultaneous access to two different SIM cards (and therefore the simultaneous activation of two different drivers) and, on the other hand, a management of two different radiocommunications protocols working at the same time.

The electronic card enabling execution of the embedded driving firmware is therefore relatively complex to implement and takes up substantial space which it is difficult to reduce.

Besides, another drawback of this dual SIM card driving mechanism is that it causes high-energy consumption. This prior-art solution is therefore not an optimal one.

3. SUMMARY

The invention, in at least one embodiment, is aimed especially at overcoming these different drawbacks of the prior art.

More specifically, it is a goal of at least one embodiment of the invention to provide a technique that reduces the time taken to switch a radiocommunications terminal from a first radiocommunications network to a second radiocommunications network.

At least one embodiment of the invention is also aimed at providing a technique of this kind that reduces the energy consumed by a radiocommunications terminal to switch from a first radiocommunications network to a second radiocommunications network.

It is another goal of at least one embodiment of the invention to provide a technique of this kind that is simple to implement and costs little.

One particular embodiment of the disclosure proposes a method for switching a radiocommunications terminal from a first radiocommunications network, with which the terminal is synchronized and registered, to a second radiocommunications network, the terminal having first and second connection profiles associated respectively with the first and second radiocommunications networks. The method according to an exemplary embodiment of the disclosure is such that it performs the following steps:

for said second connection profile, preliminary and at least partial synchronization of the terminal with the second radiocommunications network; and
upon a switching request:
complete synchronization, based on said preliminary and at least partial synchronization, of the terminal with the second radiocommunications network;
registration of the terminal with the second radiocommunications network.

Thus, an exemplary principle of the of the present disclosure includes the synchronizing of the terminal with a second radiocommunications network by anticipation so that, when the setting up of a connection on this second network is effectively requested, the switching from the first network to the second network is thereby accelerated.

The first and second connection profiles enable connection, i.e. getting synchronized and getting registered respectively with the first and second radiocommunications networks.

This technique therefore enables the terminal to switch from a first to a second radiocommunications network in shorter time than that proposed by prior-art solutions.

This technique finds particularly advantageous application in the case of a radiocommunications network implementing an emergency call service for example.

According to one particular aspect of the disclosure, the step of preliminary and at least partial synchronization comprises a step of frequency scanning in a predetermined frequency band and of measuring the reception power level of the beacon frequencies of the second radiocommunications network.

Thus, this embodiment enables the terminal to partially carry out the step of preliminary synchronization, only the frequency scanning being implemented by the terminal.

According to one particular aspect of the disclosure, the step of preliminary and at least partial synchronization comprises the following steps:

frequency scanning in a predetermined frequency band and measurement of level of reception of the beacon frequencies of the second radiocommunications network;
time and frequency synchronization of the terminal with the beacon frequencies of the second radiocommunications network.

Thus, in this embodiment, known as a preferred embodiment, it is planned that the terminal will anticipatedly carry out a full synchronization with the second communications network. This has the effect of making the terminal even more reactive when the switching from the first network to the second network is requested (the synchronization having been done preliminarily and totally).

According to one particular aspect of the disclosure, the step of preliminary and at least partial synchronization is reiterated.

Thus, the disclosure provides for the implementing, in the course of time, of a tracking and updating of the results of the preliminary and at least partial synchronization of the terminal with the second network (this process is also called "monitoring") in order to take account of possible movements of the terminal. Such a mechanism indeed makes it possible to ensure that the terminal remains accurately synchronized (or partially synchronized) with the second network whatever its position before a switch to the second network is requested.

According to one particular characteristic, the step of preliminary and at least partial synchronization is reiterated in one of the following ways:

periodically;
upon positive verification of one of the following events:
the detection of a change in position of the terminal;
the detection of a request for reiteration of preliminary and at least partial synchronization via a man/machine interface.

The fact of reiterating the step of synchronization only when a change in position of the terminal has been detected reduces the number of reiterations to be made. Such an implementation therefore reduces the energy consumption of the terminal. For example, if a change is detected in cells of the first network with which the terminal is synchronized and registered (i.e. connected), this is considered to mean that the synchronization of the terminal with the second network should very probably be updated.

In one alternative embodiment, it can be provided that the user of terminal, wishing to update the synchronization results manually, will send a request for reiterating synchronization via a man/machine interface.

According to one particular aspect of the disclosure, the method furthermore comprises the following steps, the second connection profile being stored on at least one detachable card inserted in the terminal:

extracting said second connection profile from said detachable card;

storing said extracted second connection profile in a local storage memory included in the terminal.

The fact of preliminarily and locally storing certain pieces of information needed for the registration of the terminal with the second network enables the terminal to retrieve them more speedily for the registration of the terminal when switching to the second network. Thus, this enables the terminal to switch even more speedily to the second network.

According to one advantageous characteristic, the results of said preliminary and at least partial step of synchronization of the terminal are stored in the local storage memory.

Thus, the switching of the terminal is optimized in a simple and low-cost way.

According to one advantageous characteristic, the second network belongs to a plurality of second radio communications networks, the terminal has a second connection profile for each of the second radiocommunications networks, the terminal performs said preliminary and at least partial synchronization step for each of the second connection profiles and the switching request identifies one of the second radiocommunications networks to which the terminal must switch.

Another embodiment of the disclosure proposes a computer program product comprising program code instructions for implementing the above-mentioned method (in any one of its different embodiments) when said program is executed on a computer.

Another embodiment of the disclosure proposes a computer-readable and non-transient storage medium storing a computer program comprising a set of instructions executable by a computer to implement the above-mentioned method (in any one of its different embodiments).

Another embodiment of the disclosure proposes a radiocommunications terminal intended for switching from a first radiocommunications network, with which the terminal is synchronized and registered, to a second radiocommunications network, the terminal having available first and second connection profiles respectively associated with the first and second radiocommunications networks. The terminal is such that it comprises:

means for the preliminary and at least partial synchronization of the terminal with the second radiocommunications network, activated for said connection profile; and means of complete synchronization, based on said preliminary and at least partial synchronization of the terminal with the second radiocommunications network;

means for registering the terminal with the second radiocommunications network; said means of complete synchronization and registration of the terminal being activated upon a switching request.

Advantageously, the radiocommunications terminal comprises means for implementing steps that it performs in the switching method as described here above in any one of its different embodiments.

4. LIST OF FIGURES

Other features and advantages of the disclosure shall appear from the following description, given by way of an indicative and non-exhaustive example and from the appended drawings, of which.

5. DETAILED DESCRIPTION

In all the figures of the present document, the identical elements and steps are designated by a same numerical reference.

A technique is proposed for the speedy and efficient switching of a radiocommunications terminal from a first radiocommunications network to a second radiocommunications network, from among a plurality of radiocommunications networks.

Figure 2:
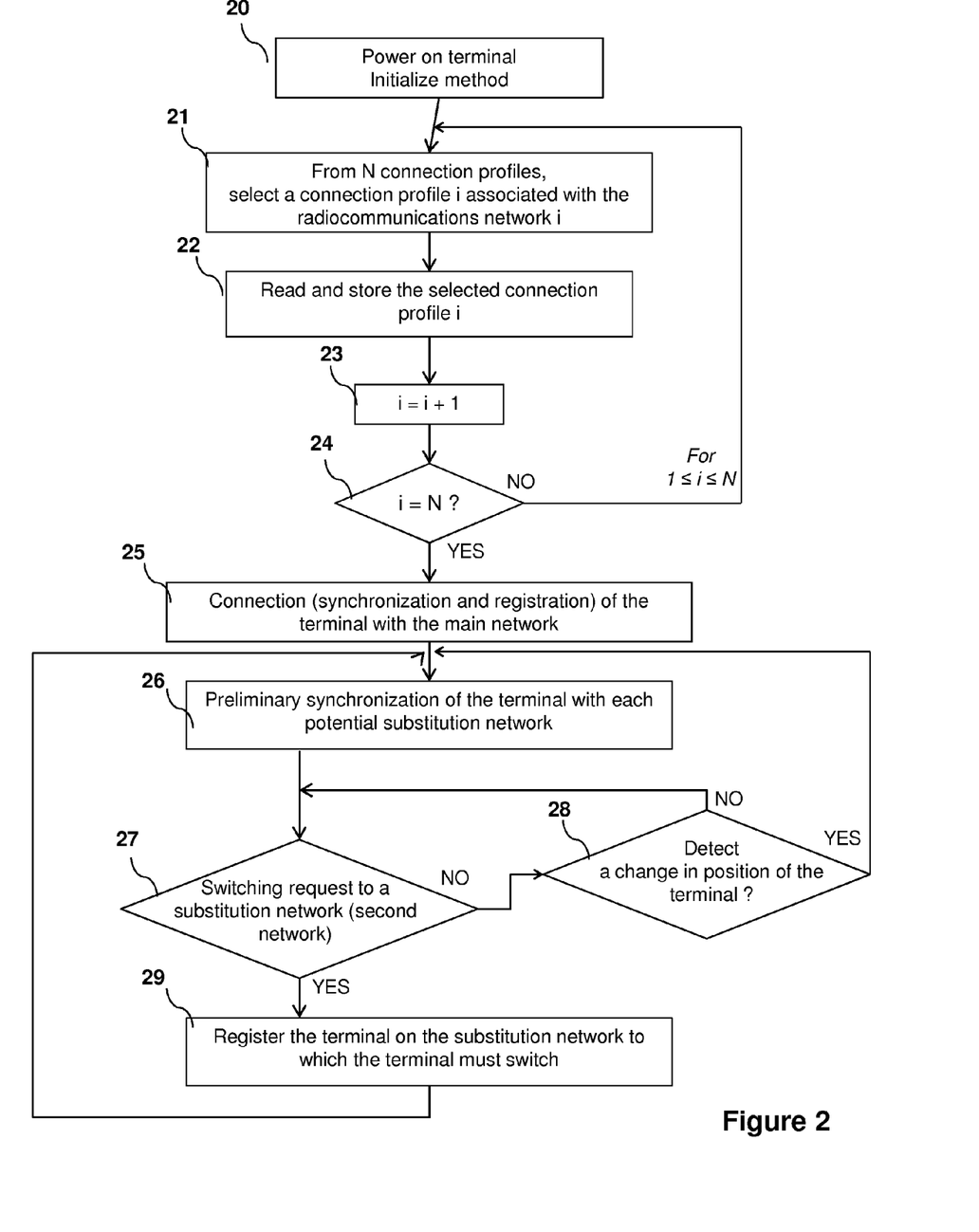
FIG. 2 presents a flowchart of a first particular embodiment of the method according to the disclosure.

Referring to FIG. 2, the main steps of an algorithm implemented according to a first particular embodiment of the disclosure are now presented.

The radiocommunications terminal has a set of N connection profiles respectively associated with N radiocommunications networks.

In this embodiment, the connection profiles are all considered to be stored on a same detachable SIM card inserted into the terminal. Naturally, this is an example of an implementation of the disclosure and it can be envisaged that the connection profiles will be stored in distinct cards or else in distinct storage media that are included in the terminal and/or are at a distance.

Classically, each connection profile comprises all the information needed to enable the terminal to get connected (i.e. to get synchronized and registered) with the radiocommunications network with which the profile is associated. A connection profile comprises especially the following pieces of information: network connection identifier, international mobile subscriber identity (IMSI), frequency band of synchronization associated with the network, authentication key, associated algorithms for the authentication of subscriber by the network, etc.

At the step 20, the terminal is powered on and initializes the switching method.

At a step 21, the terminal connects up with the SIM card and selects a connection profile indexed i from among the N connection profiles stored on the SIM card. The connection profile i is associated with the communications network indexed i. The variable i is an integer ranging from 1 to 10. The index i takes a default value of 1 when the method is initialized.

At a step 22, the terminal makes a reading of the pieces of information contained in the selected connection profile i, and then stores them in a local memory included in the terminal.

At a step 23, the terminal increments the value i by the value 1 (i=i+1) in order to select and extract a new connection profile from said SIM card.

Then, at a step 24, the terminal tests to see whether the N connection profiles are all extracted from the SIM card and stored in the local memory of the terminal. If the result of the test is positive, then the algorithm passes to the step 25. If the result of the test is negative, then the steps 21 to 24 are repeated for each connection profile not yet extracted and stored in the local memory of the terminal.

At the end of this iterative process, the terminal has all the N connection profiles available in its memory as well as the pieces of associated connection information.

At a step 25, the terminal gets connected by default to a network, among the N radiocommunications networks that is the main radiocommunications network. The main network is for example a GSM network offering access to telematic applications. The main network here is considered to be the radiocommunications network having an index i equal to 1.

To this end, the terminal gets knowledge of the connection profile indexed 1 preliminarily stored in its local memory and carries out:

in a first stage, a measurement of the level of reception of the beacon frequencies that it receives by scanning the entire frequency band, as a function of the connection profile indexed 1;

in a second stage, a time and frequency synchronization so as to get synchronized with the main network.

Once it is synchronized with the main network, the terminal gets registered with this network by means of the connection profile indexed 1 so that it can be authorized to set up outgoing communication calls on this network. Once the terminal is synchronized and registered (and therefore connected), the terminal can set up outgoing communication calls on this network and the user can henceforth access the telematic services proposed by this network.

Here below in the description, the term "current network" is understood to mean the radiocommunications network to which the terminal is connected, i.e. the network with which it is synchronized and registered (the term used then is "first network") and the term "substitution network" is understood to mean the radiocommunications network to which the terminal is likely to or must switch (the term used then is "second network").

At a step 26, the terminal carries out a preliminary and complete synchronization with each of the substitution radiocommunications networks to which it is likely to switch. These are radiocommunications networks indexed 2 to N, the current network being the network indexed 1.

In other words, the terminal will sequentially carry out the preliminary synchronization on each of the N−1 potential substitution networks at its disposal. More particularly, this step of preliminary synchronization consists of the performance for each connection profile indexed i, with i ranging from 2 to N, of:

a measurement of the level of reception of the beacon frequencies received from the radiocommunications network indexed i by scanning the frequency band as a function of the connection profile indexed i;

a time and frequency synchronization of the terminal with the beacon frequencies of the radiocommunications network indexed i.

At the end of this step, the terminal is preliminarily synchronized with all the potential substitution networks towards which the terminal is likely to switch before any possible switching request is sent. Making a complete synchronization anticipatedly on all the potential substitution networks makes the terminal highly reactive when a switch from the main network towards one of these substitution networks has to be done.

The preliminary synchronization step 26 described here above is complete in that it comprises a step for measuring power by frequency scanning and a step for time and frequency synchronization. In one embodiment that is less preferred but can be envisaged, it is possible to plan for a step of synchronization that is preliminary and partial in that it would comprise only the step for measuring power. This alternative embodiment has the advantage of gaining time at the step 26 but has the drawback of having an effective switching mechanism that is slower at the step 29 especially because the process of preliminary synchronization will not be completely finalized before switching to the second network (the time and frequency synchronization step having not been implemented beforehand).

The results coming from the preliminary and at least partial synchronization of the terminal are stored in the local storage memory.

At a step 27, the terminal checks to see if a request for switching from the current network to a substitution network has been sent. If the result is positive, then the algorithm passes to the step 29. The switching request identifies, from among the N−1 possible substitution networks, the substitution network to which the terminal must switch. If the result is negative, then the algorithm passes to the step 28.

Here, by way of a purely illustrative example, the substitution radiocommunications network to which the terminal must switch is considered to be a network providing access to an emergency call service. It is considered here that this radiocommunications network corresponds to the network with an index i equal to 2, to which the connection profile indexed 2 is connected.

For example, when an out-going call is requested to a different network than the current, ("main network") on which the terminal is camped, the terminal has basically to:

Switch on the requested set of administrative data, i.e. select the SIM profile, the SIM card or the information database corresponding to the network on which the call is assumed to be established;

Restore the content of this selected administrative data set;

Switch on the network on which the call is assumed to be established. Basically, the terminal has to synchronize on any cells belonging to the requested network and for which it previously performed monitoring while being camped on "main network".

At the step 29, since the terminal has already been completely synchronized with the network for access to the emergency call service, it no longer needs to register on this network. To this end, the terminal restores the information needed for its registration with this network through the connection profile indexed 2 stored in its local memory. Then, it proceeds classically to get registered on the network providing access to the emergency call service. The terminal thus connected to this network providing access to the emergency call service enables the user to make an emergency call.

The emergency call network then becomes the new current radiocommunications network (i.e. the first network) on which the terminal is connected (i.e. synchronized and registered) and the algorithm returns to the step 26. The terminal then reconnects with the main network which was formerly the current network in the list of substitution radiocommunications networks, in order relaunch the switching process described here above to enable a new switch from the current radiocommunications network to one of the substitution networks.

In the case of an alternative embodiment based on a partial synchronization of the step 26, a complete synchronization of the terminal with the substitution network towards which the terminal must switch must be done at the step 29 on the basis of the partial synchronization, before the step for registering the terminal is made.

It must be noted that the preliminary and local storage of the information needed for registering the terminal with the network to which it must switch combined with the mechanism for anticipated synchronization of the terminal drastically reduces the time taken to switch from a first radiocommunications network to a second radiocommunications network since only the registration with the second network is needed to enable the switching.

Naturally, it is possible to plan for an alternative embodiment in which the terminal does not comprise any local memory and must get connected to the SIM card in order to retrieve the registration information included in the connection profile associated with the second network to carry out the registration step (this is a variant not shown in the figure). This variant would offer a switching process which however is slightly less reactive.

According to one particularly advantageous characteristic, the disclosure also provides for implementation of a tracking and an updating of the results of the preliminary synchronization of the terminal with each of the potential substitution networks (this process is also called "monitoring"). To this end, so long as no switching of the terminal has been requested (step 27), the terminal, in a step 28, checks to see whether a change of position of the terminal in the current network has been detected. If the result is negative, then the algorithm passes to the step 29. If the result is positive, then the algorithm loops back to the step 26 so as to reiterate the preliminary synchronization step. This makes it possible to take account of the movements of the terminal in time. A change in position of the terminal can be detected for example by means of a technique for detecting a change in beacon frequency of the current network with which the terminal has been synchronized. Indeed, a change of beacon frequency means that the terminal has got synchronized with a new cell of the current network. This implies a probable movement of this terminal in the current network. In this case, the terminal at least partially reiterates the step of preliminary synchronization 26.

It can be planned to reiterate the step of synchronization of the terminal partially with each of the substitution networks, for example by implementing only the step for measuring power at reception or only the step of time and frequency synchronization. It is also possible to envisage reiterating the step for synchronizing the terminal completely with each of the substitution networks by implementing all the steps needed for the synchronization: measurement of power at reception and time and frequency synchronization.

In the example described with reference to FIG. 2, the step for preliminary and at least partial synchronization 26 is reiterated only upon detection of a change in position of the terminal. This particularly advantageous implementation reduces the number of reiterations to be implemented (no updating is considered to be necessary when the terminal is immobile), but also optimizes the energy consumption of the terminal. It is possible to envisage other embodiments without departing from the framework of the disclosure. It is also possible for example to plan that the preliminary (partial or complete) synchronization step will be reiterated periodically, for example every five seconds so as to benefit from a recent updating of the results or else at lower periodicities, for example every 60 seconds so as to reduce the energy consumption of the terminal. An acceptable compromise between these two constraints (energy consumption and updating of synchronization results) would depend on the appreciation of those skilled in the art.

The results derived from the step for the preliminary and at least partial synchronization of the terminal are stored at each iteration in the local storage memory.

In the example described here with reference to FIG. 2, the step 25 provides for the selection by default of the main radiocommunications network from among N radiocommunications networks. Naturally, this is an example of an embodiment and many other embodiments can be implemented without departing from the framework of the disclosure. It is possible to envisage implementing a variant in which the first network to which the terminal must get connected is selected not by default but according to a criterion of quality of communications of the terminal with this network. To this end, the terminal, in a first stage, implements the step of preliminary and at least partial synchronization on all the N radiocommunications networks in order to estimate the level of quality of communication for each of these networks. This step of estimation can be carried out for example by making measuring the level of reception of the beacon frequencies received for each of the radiocommunications networks. Then, at a second stage, the terminal identifies that network, among the N radiocommunications networks, for which the estimated level of communications quality is the best, and selects it as the current radiocommunications network.

Figure 3:
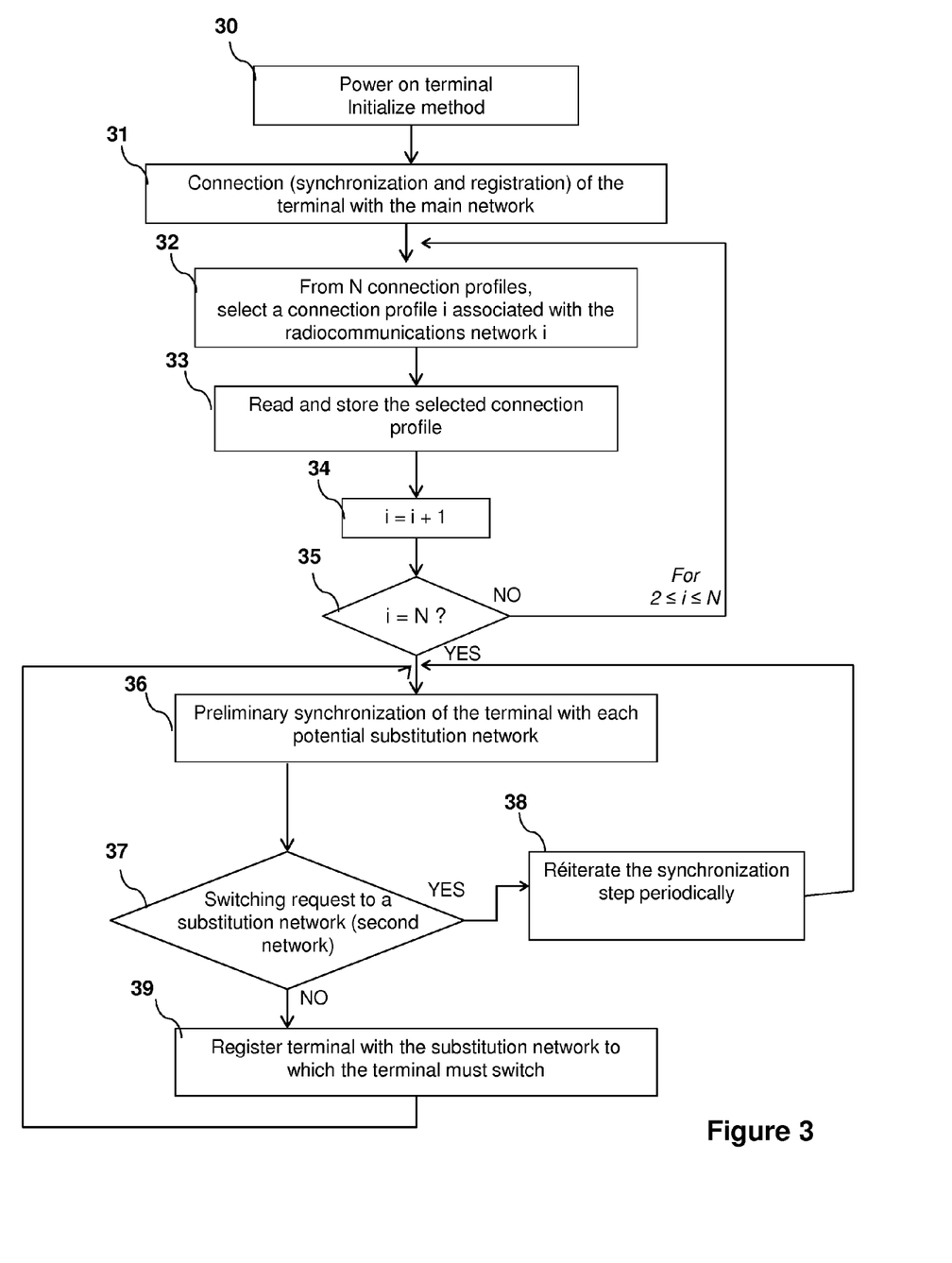
FIG. 3 presents a flowchart of a second particular embodiment of the method according to the disclosure.

Referring now to FIG. 3, we present the main steps of an algorithm implementing the switching method according to a second particular embodiment of the disclosure.

The radiocommunications terminal herein has available a set of N connection profiles respectively associated with N radiocommunications networks. Classically, each connection profile comprises all the information needed for the terminal to get connected (i.e. to get synchronized and registered) with the radiocommunications network with which the profile is associated.

At a step 30, the terminal is powered on and initializes the switching method.

At a step 31, the terminal gets connected by default with that network, among the N radiocommunications networks, which is the main radiocommunications network. Herein, the main network is considered to be the radiocommunications network with an index i equal to 1. To this end, the terminal selects the connection profile indexed i stored in the SIM card and extracts the information needed to enable the connection of the terminal to the main network. It then carries out:

a measurement of level of reception of the beacon frequencies which it receives in scanning the predetermined frequency band associated with the main network;

a time and frequency synchronization in order to get synchronized with the main network;

a registration with said main network by means of the connection profile indexed 1, so that it can be permitted to set up outgoing communication calls on this network.

Once the terminal is synchronized and registered (and therefore connected), it is capable of setting up outgoing communication calls on this network and the user can henceforth access the telematic services proposed by this network.

It must be noted that the terminal can store the connection information on the main network in a local memory as in the case of the embodiment described with reference to FIG. 2.

At a step 32, the terminal gets connected again to the SIM card to select the connection profile indexed i stored on the SIM card. The connection profile i is associated with the communications network indexed i. The variable i is an integer ranging from 2 to N. The index i takes the value 2 by default when this step of the algorithm is initialized.

At a step 33, the terminal reads the information contained in the selected connection profile i, and then stores this information in a local memory included in the terminal.

At a step 33, the terminal increments the variable i of the value 1 (i=i+1) in order to select and extract a new connection profile from the SIM card.

Then, at a step 34, the terminal tests to see whether the N connection profiles have all been extracted from the SIM card and stored in the local memory of the terminal. If the result of the test is positive, then the algorithm passes to the step 36. If the result of the test is negative, then the steps 32 to 35 are repeated for each connection profile not yet extracted and stored in the local memory of the terminal.

At the end of this iterative process, the terminal has available in its local memory all the N connection profiles as well as the associated information on connection.

At a step 36, the terminal makes a preliminary and complete synchronization with each of the substitution radiocommunications networks to which it is likely to get switched. Here, these are radiocommunications networks indexed 2 to N, the current radiocommunications network being the network indexed 1.

More particularly, this step of preliminary synchronization consists of the performance, for each connection profile indexed i, with i ranging from 2 to N, of:
- a measurement of level of reception of the beacon frequencies received from the radiocommunications network indexed i in scanning the frequency band as a function of the connection profile indexed i;
- a time and frequency synchronization of the terminal with the beacon frequencies of the radiocommunications network indexed i.

At the end of this step, the terminal has been preliminarily synchronized with all the potential substitution networks that it has at its disposal before any possible switching to one of the networks is requested.

The step of preliminary synchronization 36 described here above is complete in that it comprises a step for measuring power by frequency scanning and a step for time and frequency synchronization. In one embodiment that is less preferred but can be envisaged, it can be planned to implement a step of partial preliminary synchronization which is partial in that it comprises only the step for measuring power.

The results coming from the step for the preliminary and at least partial synchronization of the terminal are stored in the local storage memory.

At a step 37, the terminal verifies whether a request for switching from the current network to a substitution network has been sent. If the result is positive, then the algorithm passes to the step 39. The switching request identifies the substitution network to which the terminal must switch. If the result is negative, then the algorithm passes to the step 38.

At the step 39, since the terminal is already completely synchronized with the network for access to the emergency call service, it no longer has to get registered with this network. To this end, the terminal restores the information needed for its registration with this network through the connection profile with which it is associated. Then it gets registered on this network in a classic manner. The terminal thus connected to this network benefits from the services offered by this network.

After switching, the substitution network therefore becomes the new current radiocommunications network to which the terminal is connected and the main network which was formerly the current network therefore becomes a substitution network in the same way as the other radiocommunications networks towards which the terminal had not been switched and the algorithm returns to the step 36 to again relaunch the switching process described here above.

The present disclosure furthermore provides for a step 38 for tracking and periodically updating the results of the preliminary synchronization of the terminal with each of the potential substitution networks. The step of preliminary synchronization is reiterated periodically so as to make sure that the terminal remains accurately synchronized (or partially synchronized) with each of the potential substitution networks (possible movement of the terminal in time with a change in the configuration of synchronization).

Figure 4:
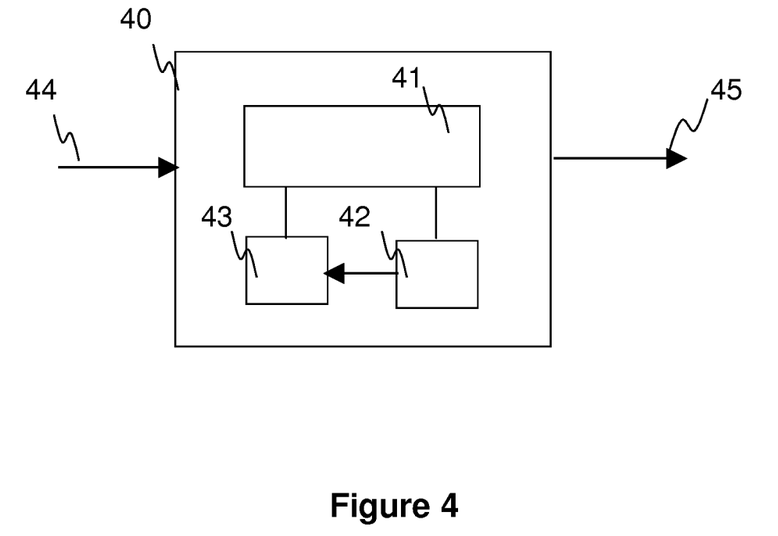
FIG. 4 presents the structure of a radiocommunications terminal according to one particular embodiment of the disclosure.

FIG. 4 presents the simplified structure of a radiocommunications terminal 40 implementing the switching method according to the disclosure (for example the particular embodiment described here above with reference to FIG. 2 or FIG. 3). This device comprises a random-access memory (for example a RAM), a processing unit 41, equipped for example with a processor and driven by a computer program stored in a read-only memory 42 (for example a ROM or a hard disk drive). Such a computer program, when executed by the processing unit 41, enables the execution of a part or of the totality of the steps of the algorithms of FIG. 2 or FIG. 3.

At initialization, the code instructions of the computer program are for example charged into the random-access memory 43 and then executed by the processor of the processing unit 41. The processing unit 41 orders the implementation of the step for the preliminary and at least partial synchronization of the terminal with the second radiocommunications network to which the terminal must get switched. Upon a request 44, received at input, for switching the terminal from a first network towards the second network, the processing unit 41 outputs a connection profile 45 associated with the second network which the terminal uses to get registered on the second network according to the instructions of the program 42 so as to enable a fast switching of the terminal towards the second network.

This FIG. 4 illustrates only one particular manner, among several, of carrying out the different algorithms described in detail here above with reference to FIGS. 2 and 3. Indeed, the technique of the disclosure can be carried out equally well on:
- a reprogrammable computation machine (a PC computer, a DSP processor or a macro-controller) executing a program comprising a sequence of instructions, or
- a dedicated computation machine (for example a set of logic gates such as an FPGA or an ASIC or any other hardware module).

Should an exemplary embodiment of the disclosure be implanted in a reprogrammable computation machine, the corresponding program (i.e. the sequence of instructions) could be stored in a detachable storage medium (such as for example a floppy disk, a CD-ROM or a DVD-ROM) or non-detachable storage medium, this storage medium being partially or totally readable by a computer or a processor.

Thus, the implementing of the switching method of the disclosure makes it possible especially to reduce the time taken to switch a terminal from a first radiocommunications network to a second radiocommunications network. In addition, the implementing of the method for switching according to the disclosure reduces the amount of energy consumed by a terminal to switch from a first radiocommunications network to a second radiocommunications network.

An exemplary embodiment of the present disclosure provides a technique of this kind that is simple to implement and costs little.

Although the present disclosure has been described with reference to one or more examples, workers skilled in the art will recognize that changes may be made in form and detail without departing from the scope of the disclosure and/or the appended claims.

The invention claimed is:

1. A method for switching a radiocommunications terminal from a first radiocommunications network, with which the terminal is synchronized and registered, to a second radiocommunications network, the terminal having first and second connection profiles associated respectively with the first and second radiocommunications networks, wherein said terminal performs the following steps:
for said second connection profile, preliminary and at least partial synchronization of the terminal with the second radiocommunications network;
receiving a request for making an outgoing call by the terminal on the second radiocommunications network; and
in response to the request for making the outgoing call, the terminal performs the following acts:
complete synchronization, based on said preliminary and at least partial synchronization, of the terminal with the second radiocommunications network; and
registration of the terminal with the second radiocommunications network.

2. The method according to claim 1, wherein the step of preliminary and at least partial synchronization comprises a step of frequency scanning in a predetermined frequency band and of measuring reception power level of beacon frequencies of the second radiocommunications network.

3. The method according to claim 1, wherein the step of preliminary and at least partial synchronization comprises the following steps:
frequency scanning in a predetermined frequency band and measuring reception power level of beacon frequencies of the second radiocommunications network; and
time and frequency synchronization of the terminal with the beacon frequencies of the second radiocommunications network.

4. The method according to claim 1, wherein the step of preliminary and at least partial synchronization is reiterated.

5. The method according to claim 4, wherein the step of preliminary and at least partial synchronization is reiterated in one of the following ways:
periodically;
upon positive verification of one of the following events:
detection of a change in position of the terminal;
detection of a request for reiteration of preliminary and at least partial synchronization via a man/machine interface.

6. The method according to claim 1, comprising the following steps, the second connection profile being stored on at least one detachable card inserted in the terminal:
extracting said second connection profile from said detachable card;
storing said extracted second connection profile in a local storage memory included in the terminal of said extracted connection profile.

7. The method according to claim 6, wherein the results of said preliminary and at least partial step of synchronization of the terminal are stored in the local storage memory.

8. The method according to claim 1, wherein:
the second network belongs to a plurality of second radio communications networks,
the terminal has a second connection profile for each of the second radiocommunications networks,
the terminal performs said preliminary and at least partial synchronization step for each of the second connection profiles.

9. A non-transitory computer-readable storage medium storing a computer program product comprising program code instructions for implementing, when said program is executed on a computer, a method for switching a radiocommunications terminal from a first radiocommunications network, with which the terminal is synchronized and registered, to a second radiocommunications network, the terminal having first and second connection profiles associated respectively with the first and second radiocommunications networks, wherein said instructions configure the terminal to perform the following steps:
for said second connection profile, preliminary and at least partial synchronization of the terminal with the second radiocommunications network;
receiving a request for making an outgoing call by the terminal on the second radiocommunications network;
in response to the request for making the outgoing call, the terminal performs the following acts:
complete synchronization, based on said preliminary and at least partial synchronization, of the terminal with the second radiocommunications network; and
registration of the terminal with the second radiocommunications network.

10. A radiocommunications terminal configured to switch from a first radiocommunications network, with which the terminal is synchronized and registered, to a second radiocommunications network, the terminal having available first and second connection profiles respectively associated with the first and second radiocommunications networks, wherein the terminal comprises:
means for preliminary and at least partial synchronization of the terminal with the second radiocommunications network, activated for said connection profile;
means for receiving a request for making an outgoing call by the terminal on the second radiocommunications network;
means for complete synchronization, based on said preliminary and at least partial synchronization of the terminal with the second radiocommunications network; and
means for registering the terminal with the second radiocommunications network;
said means for complete synchronization and registration of the terminal being activated upon the terminal receiving the request for making the outgoing call.

11. A radiocommunications terminal configured to switch from a first radiocommunications network, with which the terminal is synchronized and registered, to a second radiocommunications network, the terminal having available first and second connection profiles respectively associated with the first and second radiocommunications networks, wherein the terminal comprises:
- a reprogrammable computation machine or a dedicated computation machine configured to:
- preliminarily and at least partially synchronize the terminal with the second radiocommunications network, activated for said connection profile;
- receive a request for making an outgoing call by the terminal on the second radiocommunications network;
- completely synchronize, based on said preliminary and at least partial synchronization, the terminal with the second radiocommunications network; and
- register the terminal with the second radiocommunications network;
- wherein the complete synchronization and registration of the terminal are activated upon the terminal receiving the request for making the outgoing call.

* * * * *